(12) United States Patent
Yoshino et al.

(10) Patent No.: US 11,473,682 B2
(45) Date of Patent: Oct. 18, 2022

(54) DIAPHRAGM VALVE

(71) Applicant: ASAHI YUKIZAI CORPORATION, Nobeoka (JP)

(72) Inventors: Kenro Yoshino, Nobeoka (JP); Yusuke Oniki, Nobeoka (JP)

(73) Assignee: ASAHI YUKIZAI CORPORATION, Nobeoka (JP)

(*) Notice: Subject to any disclaimer, the term of this patent is extended or adjusted under 35 U.S.C. 154(b) by 0 days.

(21) Appl. No.: 17/298,117

(22) PCT Filed: Nov. 27, 2019

(86) PCT No.: PCT/JP2019/046437
§ 371 (c)(1),
(2) Date: May 28, 2021

(87) PCT Pub. No.: WO2020/111148
PCT Pub. Date: Jun. 4, 2020

(65) Prior Publication Data
US 2022/0049776 A1    Feb. 17, 2022

(30) Foreign Application Priority Data
Nov. 30, 2018  (JP) .............................. JP2018-224401

(51) Int. Cl.
*F16K 7/14*       (2006.01)
*F16K 31/126*   (2006.01)

(52) U.S. Cl.
CPC ............ *F16K 7/14* (2013.01); *F16K 31/1266* (2013.01)

(58) Field of Classification Search
CPC ...... F16K 31/126; F16K 7/17; F16K 31/1266; F16K 7/14
See application file for complete search history.

(56) References Cited

U.S. PATENT DOCUMENTS 2,160,849 A * 6/1939 Fausek ............... G05D 16/0672
                                                              137/329.01
2,416,345 A * 2/1947 Piccardo ................. F04D 13/16
                                                                 137/211.5
(Continued)

FOREIGN PATENT DOCUMENTS

JP     H6-295209 A    10/1994
JP    2000-120901 A    4/2000
(Continued)

OTHER PUBLICATIONS

PCT/IB/373, "International Preliminary Report on Patentability for International Application No. PCT/JP2019/046437," dated May 25, 2021.
(Continued)

*Primary Examiner* — Umashankar Venkatesan
(74) *Attorney, Agent, or Firm* — Manabu Kanesaka

(57) ABSTRACT

A diaphragm valve includes: a valve body having formed therein a first valve chamber, a second valve chamber and a communication passage communicating between the two valve chambers; a valve seat formed in the communication passage; a valve mechanism including a diaphragm supporting a valve element that comes in contact with and separates from the valve seat and a second diaphragm; a pressurizing unit being configured to pressurize the first diaphragm so as to press the valve element against the valve seat; and a bonnet for holding an outer peripheral part of the second diaphragm between the bonnet and the valve body. The pressurizing unit is configured as a single integrated unit holding therein a movable body that moves in conjunction with the valve element via a stem.

7 Claims, 8 Drawing Sheets

(56) References Cited

U.S. PATENT DOCUMENTS

| | | | | |
|---|---|---|---|---|
| 2,493,449 | A | * | 1/1950 | Fitch ................ B60T 15/18 92/143 |
| 3,601,155 | A | * | 8/1971 | Brown ................ F15C 3/04 251/29 |
| 4,615,353 | A | * | 10/1986 | McKee ............ F16K 11/044 251/61.3 |
| 5,975,116 | A | | 11/1999 | Rosas et al. |
| 5,983,926 | A | * | 11/1999 | Mastuzawa .......... G05D 7/03 137/500 |
| 6,199,582 | B1 | * | 3/2001 | Matsuzawa .......... G05D 7/03 137/503 |
| 7,070,160 | B2 | * | 7/2006 | Ijichi ................ F16K 31/1266 251/282 |
| 8,297,306 | B2 | * | 10/2012 | Igarashi .......... F16K 31/1268 137/505.42 |
| 10,228,075 | B2 | * | 3/2019 | Imai ................ F16K 31/1266 |
| 2004/0004199 | A1 | * | 1/2004 | Igarashi .......... F16K 31/1221 251/63.5 |
| 2009/0140194 | A1 | * | 6/2009 | Kato ................ F16K 7/14 251/318 |

FOREIGN PATENT DOCUMENTS

| | | |
|---|---|---|
| JP | 2000-193106 A | 7/2000 |
| JP | 2004-36765 A | 2/2004 |
| JP | 2004-038571 A | 2/2004 |
| JP | 2007-24070 A | 2/2007 |
| JP | 2008-121784 A | 5/2008 |
| JP | 2010-025171 A | 2/2010 |

OTHER PUBLICATIONS

PCT/ISA/237, "Written Opinion of the International Searching Authority for International Application No. PCT/JP2019/046437," dated Feb. 18, 2020.

PCT/IB/338, "Notification of Transmittal of Translation of the International Preliminary Report on Patentability for International Application No. PCT/JP2019/046437," dated Jun. 10, 2021.

PCT/ISA/210, "International Search Report for International Application No. PCT/JP2019/046437," dated Feb. 18, 2020.

* cited by examiner

PRIOR ART

DIAPHRAGM VALVE

RELATED APPLICATIONS

The present application is National Phase of International Application No. PCT/JP2019/046437 filed Nov. 27, 2019, and claims priority from Japanese Application No. 2018-224401, filed Nov. 30, 2018, the disclosure of which is hereby incorporated by reference herein in its entirety.

TECHNICAL FIELD

The present invention relates to a diaphragm valve used for transporting various types of fluid in a semiconductor manufacturing field, chemical factories, a food field and other various industrial fields.

BACKGROUND ART

Conventionally, in the semiconductor manufacturing field or the like, a diaphragm valve including two diaphragms as disclosed in PTL1 to PTL3 is often used to achieve the high-precision stability of control of the flow rate and the pressure of fluid.

A flow control valve 300 shown in FIG. 10, which is an example of such a diaphragm valve, includes, as a basic structure, a valve body 303 having an inlet flow passage 301 and an outlet flow passage 302, and a valve unit 307 having a valve element 304, a first diaphragm 305, and a second diaphragm 306. The valve body 303 is formed with a chamber, which is sectioned by the first diaphragm 305 and the second diaphragm 306 into: a first pressurizing chamber 308 outside the first diaphragm 305; a first valve chamber 310 located between the first diaphragm 305 and the second diaphragm 306 and being in communication with the inlet flow passage 301; a second valve chamber 311 located between the first diaphragm 305 and the second diaphragm 306 and being in communication with the first valve chamber 310 via a communication passage 312 and a valve seat 312a and with the outlet flow passage 302; and a second pressurizing chamber 309 outside the second diaphragm 306. This diaphragm valve is configured so that a constant inward pressure is constantly applied to the first diaphragm 305 via a spring retainer 314 from a spring 313 disposed inside the first pressurizing chamber 308 and a constant inward pressure is constantly applied to the second diaphragm 306 using compressed air, for example, supplied to the second pressurizing chamber 309 from outside of the second pressurizing chamber 309. The pressure-receiving area of the second diaphragm 306 is set larger than the pressure receiving area of the first diaphragm 305.

In such a flow control valve 300, when no compressed air is supplied to the second pressurizing chamber 309, the pressure of the spring 313 in the first pressurizing chamber 308 presses the valve element 304 against the valve seat 312a via the first diaphragm 305 to block the flow of fluid. In this state, compressed air is supplied to the second pressurizing chamber 309 to separate the valve element 304 from the valve seat 312a against the pressure from the spring 313, thereby setting the fluid flow rate or pressure to a predetermined value. Once the flow rate or pressure is set, constant inward pressure is always applied to the first diaphragm 305 and the second diaphragm 306, and fluctuations in the fluid pressure on the primary side (upstream) lead to back pressure fluctuations or outward pressure fluctuations against the first diaphragm 305 and the second diaphragm 306, to which constant inward pressure is always applied. This moves the valve unit 307 to try to maintain a balance between the outward fluctuating pressure on the primary side and the constant inward set pressure caused by the first pressurizing chamber 308 and the second pressurizing chamber 309. As a result of this movement of the valve unit 307, the valve element 304 moves relative to the valve seat 312a, thus changing the degree of opening between the valve element 304 and the valve seat 312a, and suppressing fluctuations in flow rate or pressure.

As described above, the flow control valve 300 having two diaphragms has areas being in contact with fluid (fluid-contact areas) which are sectioned by the diaphragms 305 and 306, so that the cleanliness of the fluid can be maintained. Therefore, such a valve is often used in the fields where fluid cleanliness is required.

CITATION LIST

Patent Literature

PTL1: Japanese Unexamined Patent Publication No. H6-295209
PTL2: Japanese Unexamined Patent Publication No. 2004-38571
PTL3: Japanese Unexamined Patent Publication No. 2007-24070

SUMMARY OF THE INVENTION

Technical Problem

The flow control valve shown in FIG. 10 commonly includes a shaft extending from the first diaphragm 305 and the second diaphragm 306 to be connected to the valve element 304, in order to make the first diaphragm 305 and the second diaphragm 306 move in conjunction with the valve element 304. The valve element 304 is larger than the communication passage extending from the valve seat for communication between the first valve chamber 310 and the second valve chamber 311. For convenience of assembly, this type of flow control valve is typically designed to integrally form a shaft portion extending from one of the first diaphragm 305 and the second diaphragm 306 with the valve element 304, and connect a shaft portion extending from the other with the valve element 304 by screwing. This requires the operation to screw the shaft portion with the valve element 304.

When a spring is used as in the flow control valve shown in FIG. 10, the spring retainer typically has an outer peripheral surface configured to move along an peripheral wall of the first pressurizing chamber 308 to correctly transmit the spring force to the first diaphragm 305. In this case, lubricant such as grease is applied to the outer peripheral surface of the spring retainer to reduce friction due to the sliding. In a case where the spring retainer is moved along a guide, lubricant such as grease is similarly applied to the guide. A piston may be placed inside the first pressurizing chamber 308 that is a cylinder chamber to move the piston by the pressure of working fluid such as compressed air so that the piston and the first diaphragm 305 move in conjunction with each other. In this case, lubricant such as grease is also applied to the outer peripheral surface of the piston to reduce friction due to the sliding between the outer peripheral surface of the piston and the peripheral surface of the cylinder chamber. Grease is also applied to the sealing components such as O-rings that are used at places where sealing is required.

When the flow control valve is manually assembled, an operator has to work by grasping the components such as the first diaphragm 305, the second diaphragm 306, and the valve element 304 to screw the shaft portion of the first diaphragm 305 or the second diaphragm 306 with the valve element 304 as described above. This can cause lubricant such as grease to adhere to the operator's hands and contaminate the fluid-contact areas such as the first diaphragm 305 or the second diaphragm 306 and the valve element 304, which is required to be clean because they come in contact with fluid. Even if lubricant such as grease is not used, in a case where a spring is used in the flow control valve, the operator's hands will touch the metal as the material of the spring. This can cause the possibility of contaminating the fluid-contact areas such as the first diaphragm 305 or the second diaphragm 306 and the valve element 304 with the metal particles adhering to the hands.

Accordingly, it is an object of the present invention to solve the problems existing in the prior art and to avoid touching with lubricant and metal during assembly of the diaphragm valve, thereby suppressing contamination of the fluid-contact areas with the lubricant and metal particles.

Solution to Problem

In view of the above-described object, the present invention provides a diaphragm valve including: a valve body having formed therein a first valve chamber being in communication with an inlet flow passage, a second valve chamber being in communication with an outlet flow passage, and a communication passage providing communication between the first valve chamber and the second valve chamber; a valve seat formed in the communication passage; a valve mechanism including a first diaphragm attached to the valve body so as to face the first valve chamber and supporting a valve element that comes in contact with and separates from the valve seat, and a second diaphragm attached to the valve body so as to face the second valve chamber; a pressurizing unit attached to the valve body so as to hold an outer peripheral part of the first diaphragm between the pressurizing unit and the valve body, the pressurizing unit pressurizing the first diaphragm so as to press the valve element against the valve seat; and a bonnet attached to the valve body so as to hold an outer peripheral part of the second diaphragm between the bonnet and the valve body, the pressurizing unit including: a first unit housing and a second unit housing that are assembled to define therein a first pressurizing chamber; a movable body being movable toward and away from the first valve chamber in the first pressurizing chamber; and a stem extending from the movable body to project outside of the pressurizing unit, the pressurizing unit being configured as a single integrated unit by connecting the first unit housing and the second unit housing with the movable body being held in the first pressurizing chamber, the valve element being connected to a tip end of the stem, the valve mechanism controlling a flow of fluid by pressurizing the movable body with a first pressurizing means to constantly apply a force to the valve element via the stem in a direction of pressing the valve element against the valve seat and pressurizing the second diaphragm with a second pressurizing means to apply a force to the valve element from the second diaphragm in a direction of separating the valve element from the valve seat.

In the diaphragm valve, the first pressurizing means pressurizes the movable body in the first pressurizing chamber of the pressurizing unit attached to the side of the valve body facing the first valve chamber, i.e., on the primary side (upstream side) to always apply a force to the valve element, which is connected with to the movable body via the stem, in a direction of pressing the valve element against the valve seat, while the second pressurizing means pressurizes the second diaphragm to apply a force from the second diaphragm to the valve element in a direction of separating the valve element from the valve seat. Thus, changing the pressurizing force from the second pressurizing means to the second diaphragm makes it possible to separate the valve element from the valve seat against the force applied by the first pressurizing means to press the valve element toward the valve seat, thereby regulating the degree of opening. Further, the pressurizing unit has a configuration in which the first unit housing and the second unit housing are connected with the movable body, which is connected mutually with the valve element via the stem, being held in the first pressurizing chamber of the pressurizing unit, thereby allowing the pressurizing unit to be handled as an integrated single unit. Therefore, if the pressurizing unit is assembled in advance in a separate step, assembly of the pressurizing unit with the valve mechanism or the valve body can be performed simply by connecting the stem extending from the pressurizing unit with the first diaphragm or attaching the pressurizing unit to the valve body without requiring a step of touching the components arranged inside the pressurizing unit. That is, even if lubricant such as grease is used to reduce friction due to the sliding of the movable body over the peripheral wall of the first pressurizing chamber or metal components are used in the pressurizing unit, the operator is not required to directly touch the lubricant or the metal components during the assembly, thereby suppressing contamination of the fluid with the lubricant or the metal particles adhering to the operator's hand.

In the diaphragm valve as described above, the second diaphragm preferably has a pressing portion that can come in contact with and separate from the valve element of the first diaphragm, and the pressing portion is configured to be brought in contact with the valve element by the second pressurizing means applying the force to the second diaphragm in a direction of bringing the second diaphragm closer to the valve seat to separate the valve element from the valve seat against the force applied to the valve element by the first pressurizing means. With such a configuration of the valve mechanism, the valve element is allowed to come in contact with or separate from the valve seat without connecting the second diaphragm and the valve element with each other. The above-described configuration of the valve mechanism can eliminate the need for screwing between the second diaphragm and the valve element in the fluid-contact area, thereby preventing fluid contamination due to the screwing portion placed in the fluid-contact area. Further, the above-described configuration of the valve mechanism can prevent the contamination in the fluid-contact area with particles of materials of the second diaphragm and the valve element which can be generated by friction due to screwing between the second diaphragm and the valve element.

In one embodiment, the first unit housing may have a tubular body formed with a through hole, the through hole including a small-diameter portion facing the first diaphragm and a large-diameter portion being larger than the small-diameter portion and connecting to the small-diameter portion so as to form a shoulder therebetween, the first unit housing and the second unit housing being connected with each other so that the second unit housing closes an end of the through hole on the side of the large-diameter portion, thus defining therein the first pressurizing chamber, the small-diameter portion of the through hole being configured to have a size that allows passage of the stem and is smaller than at least a part of the movable body disposed in the first pressurizing chamber so that at least the part of the movable body interferes with the shoulder to hold the movable body in the first pressurizing chamber. This configuration enables the movable body to be held in the first pressuring chamber when the first unit housing and the second unit housing are connected with each other. The first unit housing may further include a flange protruding outwardly from a peripheral wall of the tubular body and being placed between the valve body and the second unit housing.

In the diaphragm valve as described above, it is preferable that the first unit housing further includes a first engaging portion and the second unit housing further includes a second engaging portion, the first unit housing and the second unit housing being connected with each other by engaging the first engaging portion with the second engaging portion. It is more preferable that the first engaging portion of the first unit housing and the engaging portion of the second unit housing have a bayonet structure. This configuration can eliminate the need to use fasteners such as bolts to connect the first unit housing to the second unit housing with each other, thereby reducing contamination with metal particles.

In one embodiment, the movable body may be a spring retainer that moves in the first pressurizing chamber, and there may be a biasing spring disposed as the first pressurizing means in the first pressurizing chamber, the biasing spring biasing the spring retainer so as to press the valve element against the valve seat via the stem.

In another embodiment, the first pressurizing chamber may be a cylinder chamber, and the movable body may be a piston housed in the cylinder chamber so as to move along an inner peripheral surface of the cylinder chamber, working fluid being fed as the first pressurizing means to the cylinder chamber. In this case, there may be a further biasing spring disposed in the cylinder chamber, the further biasing spring biasing the piston toward the valve body.

In the diaphragm valve as described above, the second pressurizing means may be working fluid fed to a second pressurizing chamber formed in the bonnet to pressurize the second diaphragm, a biasing spring disposed in the second pressurizing chamber formed in the bonnet, or a combination thereof.

Preferably, the valve element and the stem are connected with each other by press-fitting.

Advantageous Effect of the Invention

According to the diaphragm valve according to the present invention, the pressurizing unit has a configuration in which the first unit housing and the second unit housing are connected mutually with the movable body, which is connected to the valve element via the stem, being held in the first pressurizing chamber of the pressurizing unit, thereby allowing the pressurizing unit to be handled as an integrated single unit. Therefore, if the pressurizing unit is assembled in advance in a separate step, assembly of the pressurizing unit with the valve mechanism or the valve body can be performed simply by connecting the stem extending from the pressurizing unit with the first diaphragm or attaching the pressurizing unit to the valve body without requiring a step of touching the components placed inside the pressurizing unit. Thus, even if lubricant such as grease is used to reduce friction due to the sliding of the movable body over the peripheral wall of the first pressurizing chamber or metal components are used in the pressurizing unit, the operator is not required to directly touch the lubricant or the metal components during the assembly, thereby making it possible to suppress contamination of the fluid-contact areas such as the valve mechanism with the lubricant or the metal particles adhering to the operator's hand to prevent contamination of the fluid.

DESCRIPTION OF EMBODIMENTS

Several embodiments of a diaphragm valve according to the present invention will be described below with reference to the drawings.

Figure 1:
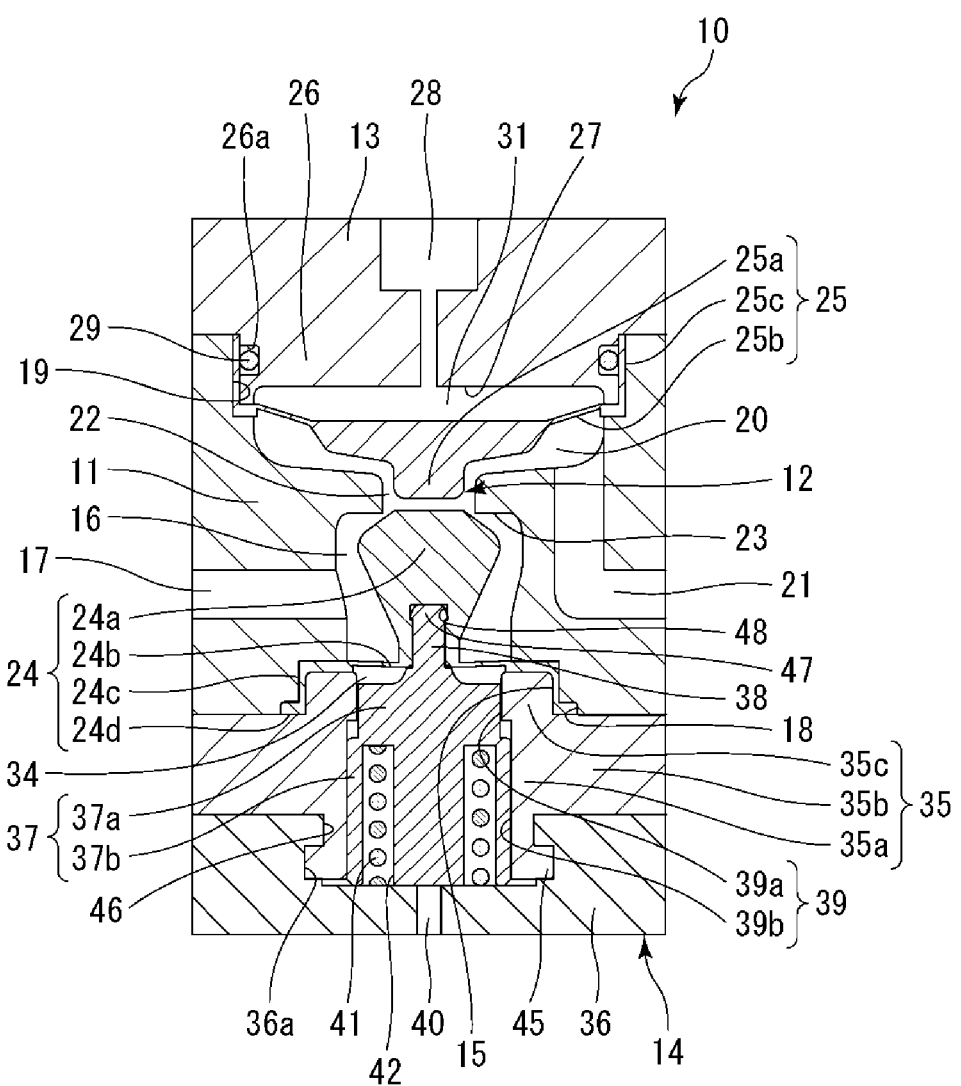
FIG. 1 is a vertical cross-sectional view showing an overall configuration of a first embodiment of a diaphragm valve according to the present invention.

FIG. 1 shows an overall configuration of a diaphragm valve 10 according to a first embodiment of the present invention. Referring to FIG. 1, the diaphragm valve 10 includes a valve body 11, a valve mechanism 12 disposed in the valve body 11, a bonnet 13 attached to the upper part of the valve body 11, and a pressurizing unit 14 attached to the lower part of the valve body 11, and the valve mechanism 12 is configured to open and close the diaphragm valve 10.

The valve body 11 is made of polytetrafluoroethylene (hereinafter referred to as PTFE). The valve body 11 is formed in the lower center thereof with a lower recess 15 that has a circular shape in plan view and a first valve chamber 16 that is located above the center portion of the lower recess 15 and has a diameter smaller than that of the lower recess 15. The lower recess 15 and the first valve chamber 16 are continuous, and the first valve chamber 16 is in communication with an inlet flow passage 17. The valve body 11 also has an annular step 18 formed on the bottom surface thereof so as to surround the lower recess 15. On the other hand, the valve body 11 is formed in the upper center thereof with an upper recess 19 that has a circular shape in plan view and a second valve chamber 20 that is located below the center portion of the upper recess 19 and has a diameter smaller than that of the upper recess 19. The upper recess 19 and the second valve chamber 20 are continuous, and the second valve chamber 20 is in communication with an outlet flow passage 21. The valve body 11 has a communication passage 22 formed for connecting the first valve chamber 16 and the second valve chamber 20, and a valve seat 23 formed around the opening of the communication passage 22 to the first valve chamber 16.

The valve mechanism 12 is constituted by a first diaphragm 24 and a second diaphragm 25. The first diaphragm 24 is made of PTFE, and includes a valve element 24a, a diaphragm part 24b extending outward from the outer circumference of the valve element 24a, a tubular vertical support portion 24c disposed at the outer peripheral edge of the diaphragm portion 24b and extending in the vertical direction, and an annular horizontal support portion 24d extending in the horizontal direction from the upper end of the vertical support portion 24c. The first diaphragm 24 is attached to the lower part of the valve body 11 by inserting the vertical support portion 24c along the inner peripheral surface of the lower recess 15 in the state where the valve element 24a is placed in the first valve chamber 16, and making the horizontal support portion 24d be received into the annular step 18 of the valve body 11, so that the first valve chamber 16 is separated from the outside and the valve body 24a to be placed in the first valve chamber 16 is supported. The second diaphragm 25 is made of PTFE, and includes a pressing portion 25a, a diaphragm portion 25b extending outward from the outer circumference of the pressing portion 25a, and a tubular support portion 25c disposed at the outer peripheral edge of the diaphragm portion 25b and extending in the vertical direction. At least a part of the pressing portion 25a has a size that allows it to be inserted into the communication passage 22. The second diaphragm 25 is attached to the upper part of the valve body 11 by inserting the tubular support portion 25c along the peripheral wall of the upper recess 19 in the state where the pressing portion 25a is placed in the second valve chamber 20, so that the second valve chamber 20 is separated from the outside and the pressing portion 25a to be placed in the second valve chamber 20 is supported. The valve element 24a of the first diaphragm 24 and the pressing portion 25a of the second diaphragm 25 are movable close to and away from each other, and are not connected with each other. A screwing portion for connection provided in the fluid-contact area requires the rotating of the components for screwing during assembly, and this can generate particles due to friction. However, the diaphragm valve 10 does not have such a screwing portion in the fluid-contact area, and thus prevents contamination of the fluid with particles generated in the screwing portion.

Figure 2:
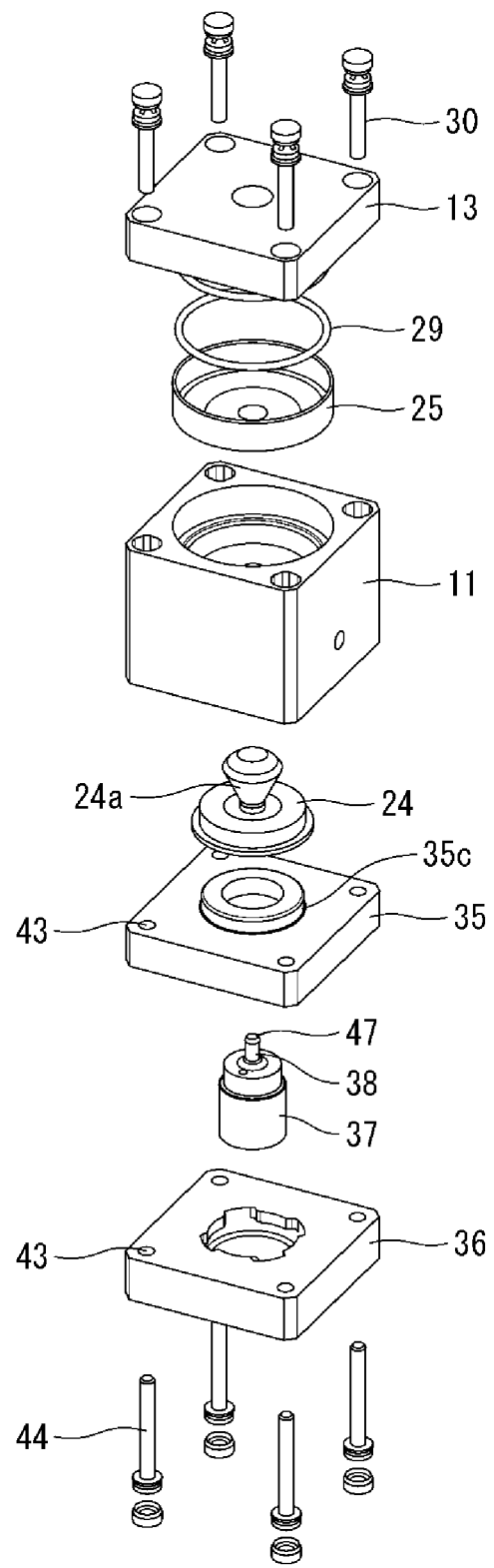
FIG. 2 is an exploded view of the diaphragm valve shown in FIG. 1.

The bonnet 13 is made of PTFE. The bonnet 13 is formed with a protrusion 26 protruding toward the valve body 11, a cylindrical concave 27 provided at the bottom of the protrusion 26 and opening downward, and a working-fluid feeding port 28 being in communication with the concave 27. The protrusion 26 has an annular receiving groove 26a formed on the outer peripheral surface thereof for an O-ring 29 to be mounted therein. The bonnet 13 is attached to the upper part of the valve body 11. To attach the bonnet 13 to the valve body 11, the protrusion 26 is inserted into the upper recess 19 of the valve body 11, and the tubular support portion 25c of the second diaphragm 25 attached to the upper recess 19 of the valve body 11 is held between the inner peripheral surface of the upper recess 19 and the outer peripheral surface of the protrusion 26 of the bonnet 13. As shown in FIG. 2, the valve body 11 and the bonnet 13 are further fixed with fasteners 30 such as bolts to secure the second diaphragm 25 to the diaphragm valve 10. In this way, the bonnet 13 is attached to the side of the valve body 11 to face the second valve chamber 20 while holding the second diaphragm 25 between the bonnet 13 and the valve body 11. As such, the second diaphragm 25 separates the concave 27 provided at the bottom of the protrusion 26 of the bonnet 13 from the second valve chamber 20, and the O-ring 29 seals the gap between the second diaphragm 25 and the protrusion 26, thus defining the second pressurizing chamber 31. Working fluid serving as a second pressurizing means is fed to the thus formed second pressurizing chamber 31 through the working-fluid feeding port 28 to change the pressure in the second pressurizing chamber 31. This can move the pressing portion 25a supported by the diaphragm portion 25b of the second diaphragm 25 up and down in the second valve chamber 20 to be inserted into the communication passage 22, thereby bringing the pressing portion 25a in contact with and separating it away from the valve element 24a.

If the O-ring 29 is mounted in advance in the annular receiving groove 26a of the protrusion 26 of the bonnet 13 and lubricant such as grease is applied to the O-ring 29 in another process, the operator will not be required to touch the O-ring 29 and the lubricant during assembly of the bonnet 13 to the valve body 11. This can inhibit contamination of the fluid-contact areas such as the first valve chamber 16 and the second valve chamber 20 where the subject fluid flows through with particles of the material of the O-ring 29 and the lubricant adhering to the operator's hands. Preferably, in order to prevent the leakage of fluid in the second valve chamber 20 to the outside, a seal member (not shown) or the like seals a gap between the outer peripheral surface of the tubular support portion 25c of the second diaphragm 25 and the inner peripheral surface of the upper recess 19. For instance, an annular groove (not shown) of trapezoidal cross-sectional shape may be provided on the inner peripheral surface of the upper recess 19 of the valve body 11, and an annular protrusion (not shown) of semicircular cross-sectional shape slightly larger than the annular groove may be provided on the outer peripheral surface of the tubular support portion 25c of the second diaphragm 25. In this case, after attaching the second diaphragm 25 to the upper recess 19 of the valve body 11 while engaging the annular protrusion with the annular groove, the protrusion 26 of the bonnet 13 may be inserted into the upper recess 19 of the valve body 11 to attach the bonnet 13 to the upper part of the valve body 11. This allows the annular protrusion to be deformed to be tightly fitted in the annular groove for sealing between the outer peripheral surface of the tubular support portion 25c of the second diaphragm 25 and the inner peripheral surface of the upper recess 19 of the valve body 11. Such sealing with the annular protrusion and the annular groove between the outer peripheral surface of the tubular support portion 25c of the second diaphragm 25 and the inner peripheral surface of the upper recess 19 of the valve body 11 reduces the number of O-rings used. This also eliminates the operation involving a touch to the O-ring or application of lubricant such as grease to the O-ring during assembly, thereby preventing the contamination of the fluid-contact areas with particles of the O-ring material or the lubricant.

Figure 3:
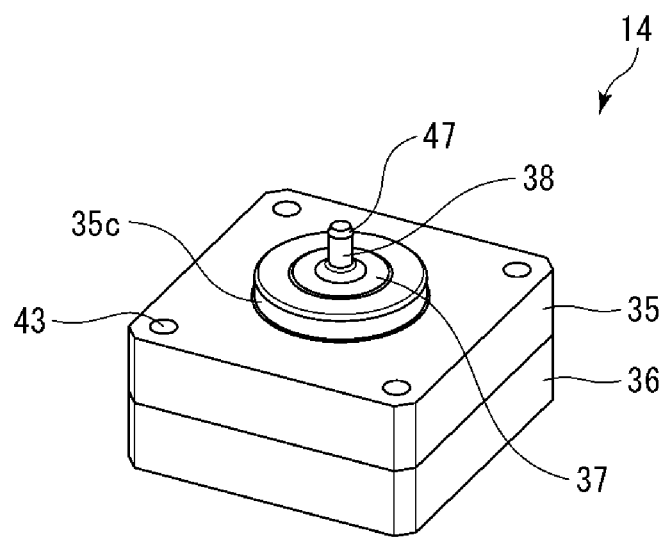
FIG. 3 is a perspective view showing a pressurizing unit of the diaphragm valve shown in FIG. 1.

The pressurizing unit 14 is attached to the lower part of the valve body 11, and is used to pressurize the first diaphragm 24 so as to press against the valve seat 23 the valve element 24a of the first diaphragm 24 attached to the first valve chamber side of the valve body 11. This pressurizing unit 14 includes several components to be assembled as shown in FIG. 3 to be handled as a single integrated unit. Specifically, the pressurizing unit 14 includes a first unit housing 35 and a second unit housing 36 that are assembled to define therein the first pressurizing chamber 34, a movable body 37 being movable toward and away from the first valve chamber 16 in the first pressurizing chamber 34, and a stem 38 extending from the movable body 37 to project outside of the pressurizing unit 14. The valve element 24a of the first diaphragm 24 placed in the first valve chamber 16 is connected to the tip end of the stem 38. The pressurizing unit 14 is configured so that the movable body is pressurized toward the first valve chamber 16 by the first pressurizing means. The pressurizing unit 14 pressurizes the movable body 37 with the first pressurizing means in this way, so as to always apply a force to the valve element 24a, which moves in conjunction with the movable body 37 via the stem 38, in a direction to press the valve element 24a against the valve seat 23.

In the embodiment shown in FIG. 1, the first unit housing 35 includes the tubular body 35a, and the tubular body 35a has a through hole 39 formed therein. The through hole 39 includes a small-diameter portion 39a formed on the side thereof facing the first diaphragm 24 and a large-diameter portion 39b that is larger than the small-diameter portion 39a and connects with the small-diameter portion 39a so as to form a shoulder therebetween. The second unit housing 36 having a substantially flat plate shape is connected to the first unit housing 35 so that the second unit housing 36 closes the opposite end of the large-diameter portion 39b to the small-diameter portion 39a, thus defining the first pressurizing chamber 34. The second unit housing 36 has a breathing port 40 formed to open to the through hole 39 of the first unit housing 35, allowing air to let in and out of the first pressurizing chamber 34. The movable body 37 placed in the first pressurizing chamber 34 includes a reduced portion 37a that is slightly smaller than the small-diameter portion 39a and moves along the peripheral wall of the small-diameter portion 39a, and an enlarged portion 37b that is slightly smaller than the large-diameter portion 39b and larger than the small-diameter portion 39a and moves along the peripheral wall of the large-diameter portion 39b, so that there is a step formed between the reduced portion 37a and the enlarged portion 37b. The enlarged portion 37b of the movable body 37 is larger than the small-diameter portion 39a of the through hole 39 of the first unit housing 35. Therefore, when the first unit housing 35 and the second unit housing 36 are connected to each other while placing the movable body 37 in the first pressurizing chamber 34, the step interferes with the shoulder so that the movable body 37 can be held in the first pressurizing chamber 34. In the first embodiment, the movable body 37 is formed as a spring retainer. The enlarged portion 37b has an annular spring groove 42 formed on the bottom surface thereof to receive at least one end portion of a biasing spring 41 as a first pressurizing means disposed between the second unit housing 36 and the movable body 37. The biasing spring 41 constantly biases the movable body 37 toward the first valve chamber 16. As a result, the movable body 37 in the first pressurizing chamber 34, biased by the biasing spring 41 toward the first valve chamber 16, tends to move along the peripheral wall in the first pressurizing chamber 34. Along with this movement, to the valve element 24a of the first diaphragm 24 connected to the tip end of the stem 38 of the movable body 37 constantly is applied a force in the direction of pressing the valve element 24a against the valve seat 23.

To open the diaphragm valve 11, working fluid is supplied into the second pressurizing chamber 31 through the working-fluid feeding port 28 to increase the pressure in the second pressurizing chamber 31, thereby lowering the pressing portion 25a supported by the second diaphragm 25 to come in contact with the valve element 24a and applying a force to the valve element 24a in the direction to separate the valve element 24a from the valve seat 23. Thus, the valve element 24a is separated from the valve seat 23 against the force that the pressurizing unit 14 constantly applies to the valve element 24a in the direction of pressing the valve element 24a against the valve seat 23, so that the fluid can flow from the first valve chamber 16 to the second valve chamber 20. The flow rate of fluid can be adjusted by adjusting the pressure in the second pressurizing chamber 31 to change a gap between the valve seat 23 and the valve element 24a.

In the first embodiment shown in the drawings, the first unit housing 35 further includes a flange 35b protruding outward from a part of the peripheral wall of the tubular body 35a below the upper end of the peripheral wall so as to have the same outer shape as the outer shape of the second unit housing 36. The flange 35b is placed between the second unit housing 36 and the valve body 11 when the pressurizing unit 14 is attached to the lower part of the valve body 11, so that the horizontal support portion 24d located at the outer edge of the first diaphragm attached to the lower recess 15 of the valve body 11 is held between the flange 35b and the annular step 18 of the valve body 11. The flange 35b is provided below the upper end of the peripheral wall of the tubular body 35a, and the tubular body 35a has a protrusion 35c protruding upward from the flange 35b. The protrusion 35c is inserted into the lower recess 15 of the valve body 11 when the pressurizing unit 14 is attached to the valve body 11, so that the vertical support portion 24c of the first diaphragm 24 attached to the lower recess 15 of the valve body 11 is held between the outer peripheral surface of the lower recess 15 and the outer peripheral surface of the protrusion 35c of the first unit housing 35. After that, as shown in FIG. 2, fasteners such as bolts 44 are inserted into attachment holes 43 penetrating through the flange 35b of the first unit housing 35 and the second unit housing 36 to fix the pressurizing unit 14 to the valve body 11, thus fixing the second first diaphragm 24 to the diaphragm valve 10.

Preferably, in order to prevent the leakage of fluid in the first valve chamber 16 to the outside, a seal member, etc., seals a gap between the outer peripheral surface of the vertical support portion 24c of the first diaphragm 24 and the inner peripheral surface of the lower recess 15. For instance, an annular groove (not shown) of trapezoidal cross-sectional shape may be provided on the inner peripheral surface of the lower recess 15 of the valve body 11, and an annular protrusion (not shown) of semicircular cross-sectional shape slightly larger than the annular groove may be provided on the outer peripheral surface of the vertical support portion 24c of the first diaphragm 24. In this case, after attaching the first diaphragm 24 to the lower recess 15 of the valve body 11 while engaging the annular protrusion with the annular groove, the protrusion 35c of the first unit housing 35 of the pressurizing unit 14 may be inserted into the lower recess 15 of the valve body 11 to attach the pressurizing unit 14 to the lower part of the valve body 11. This allows the annular protrusion deformed to be tightly fitted in the annular groove for sealing between the outer peripheral surface of the vertical support portion 24c of the first diaphragm 24 and the inner peripheral surface of the lower recess 15 of the valve body 11. Such sealing with the annular protrusion and the annular groove between the outer peripheral surface of the vertical support portion 24c of the first diaphragm 24 and the inner peripheral surface of the lower recess 15 of the valve body 11 reduces the number of O-rings used. This also eliminates the operation involving a touch to the O-ring or application of lubricant such as grease to the O-ring during assembly, thereby preventing the contamination of the fluid-contact areas with particles of the O-ring material or the lubricant.

As long as the pressurizing unit 14 can be handled as a single integrated unit, the first unit housing 35 and the second unit housing 36 may be connected with each other by appropriate methods, including the method using fasteners such as bolts and the method without using fasteners. However, in order not to increase the number of components and to simplify the work, it is preferable to mutually engage a first engaging portion of the first unit housing 35 and a second engaging portion of the second unit housing 36 to connect the first unit housing 35 and the second unit housing 36 with each other without using fasteners.

Figure 4:
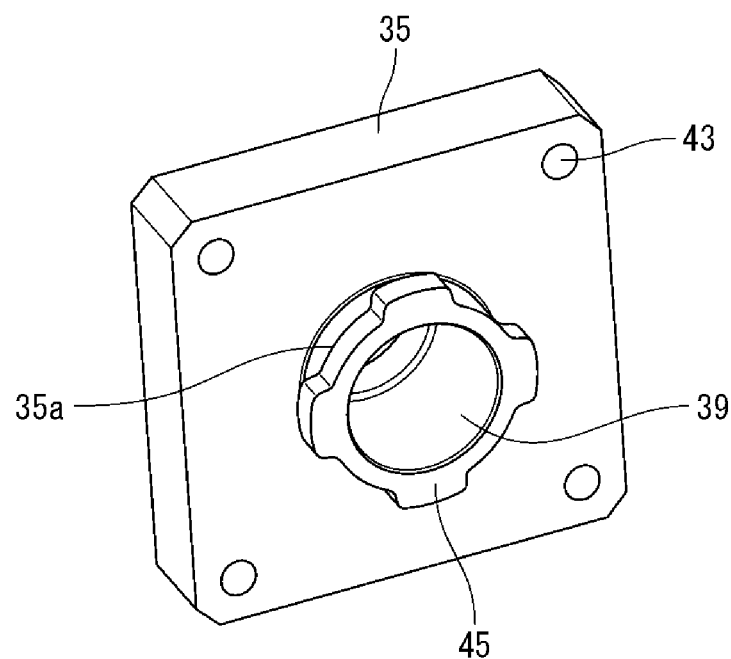
FIG. 4 is a perspective view of a first unit housing of the pressurizing unit shown in FIG. 3 as viewed from the below.
Figure 5:
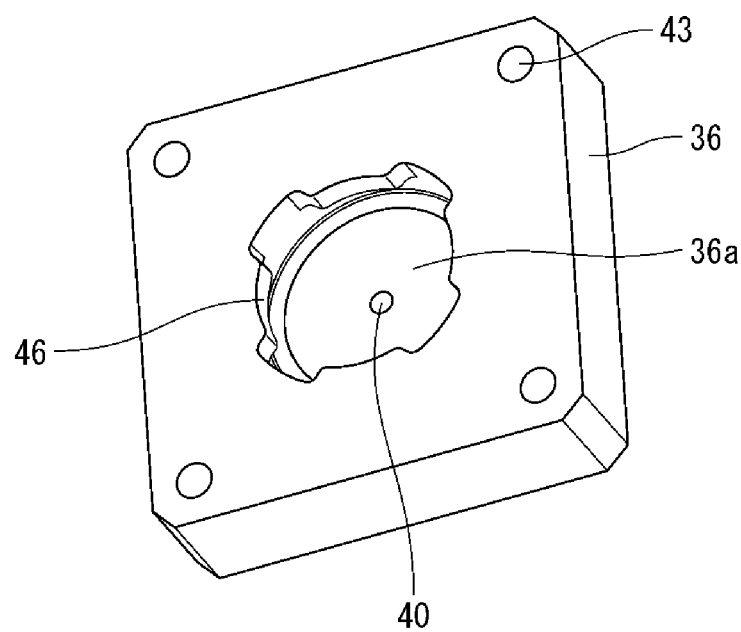
FIG. 5 is a perspective view of a second unit housing of the pressurizing unit shown in FIG. 3 as viewed from the above.

To this end, the first unit housing 35 and the second unit housing 36 in the embodiment shown in FIG. 1 are connected with each other using a bayonet structure. The bayonet structure of the shown embodiment will be described below in detail. As shown in FIG. 4, there is a groove formed below the flange 35b at the lower end of the tubular body 35a of the first unit housing 35 to provide as a first engaging portion a plurality of bayonet claws 45 (four bayonet claws shown in FIG. 4) protruding outward from the groove and extending circumferentially. On the other hand, as shown in FIG. 5, there is a receiving hole 36a formed in the second unit housing 36 for receiving a part of the tubular body 35a of the first unit housing 35 below the flange 35b, and the receiving hole 36a has a plurality of bayonet claws 46 (four bayonet claws 46 shown in FIG. 5) protruding inward from the inner peripheral surface of the receiving hole 36a and extending circumferentially, as a second engaging portion. The plurality of bayonet claws 45 of the tubular body 35a and the plurality of bayonet claws 46 of the receiving hole 36a have lengths and intervals such that the plurality of bayonet claws 45 of the tubular body 35a can pass through a space between the plurality of bayonet claws 46 of the receiving hole 36a and the plurality of bayonet claws 46 of the receiving hole 36a can pass through a space between the plurality of bayonet claws 45 of the tubular body 35a. With this configuration, the plurality of bayonet claws 45 of the tubular body 35a, in which the movable body 37 and the biasing spring 41 are housed, is placed between the plurality of bayonet claws 46 of the receiving hole 36a and is allowed to pass through the space between the plurality of bayonet claws 46 to insert a part of the tubular body 35a below the flange 35b into the receiving hole 36a. After that, the first unit housing 35 and the second unit housing 36 are rotated relative to each other, thereby engaging the bayonet claws 45 of the tubular body 35a with the bayonet claws 46 of the receiving hole 36a to connect the first unit housing 35 and the second unit housing 36 without using fasteners such as bolts while holding the movable body 37 and the biasing spring 41 in the first pressurizing chamber 34. This makes it possible to handle the pressurizing unit 14 as a single integrated unit.

In this way, the pressurizing unit 14 can be handled as a single integrated unit. Therefore, if the pressurizing unit 14 is assembled in a separate step, an operator may attach the pressurizing unit 14 to the valve body 11 without touching the lubricant such as grease and the biasing spring 41, even in the case where lubricant such as grease is applied to the outer peripheral surface of the movable body 37 to reduce the friction between the outer peripheral surface of the movable body 37 and the inner peripheral surface of the first pressurizing chamber 34 or the case where the metal material is used in the biasing spring 41. This can inhibit contamination of the fluid-contact areas such as those in the valve element 24a, the first valve chamber 16 and the second valve chamber 20 with the lubricant or the metal particles adhering to the operator's hands.

Figure 6:
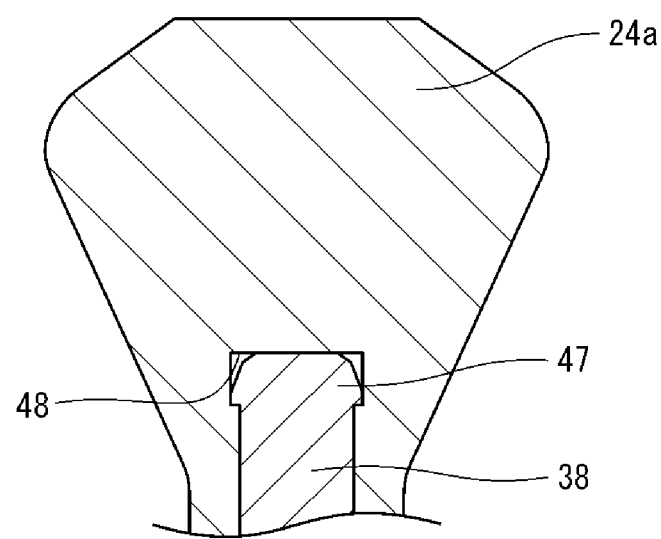
FIG. 6 is an enlarged cross-sectional view showing a connection part between a stem of the pressurizing unit and a valve element of the first diaphragm in the diaphragm valve shown in FIG. 1.

The stem 38 extends from the reduced portion 37a of the movable body 37 of the pressurizing unit 14 through the small-diameter portion 39a of the through hole 39 of the first unit housing 35 to project from the pressurizing unit 14. The tip end of the stem 38 is connected with the valve element 24a of the first diaphragm 24 when the protrusion 35c of the first unit housing 35 of the pressurizing unit 14 is inserted into the lower recess 15 of the valve body 11 for mounting the pressurizing unit 14 to the valve body 11. The method of connecting the tip end of the stem 38 with the valve element 24a is not particularly limited. However, the tip of the stem 38 is preferably connected with the valve element 24a, simply by press-fitting the tip end of the stem 38 into the valve element 24a, without forming a screw portion on the stem 38 and the valve element 24a. In the first embodiment, as shown in detail in FIG. 6, the connecting end of the stem 38 has a retainer 47 having a large diameter, and such a connecting end of the stem 38 (i.e., the retainer 47) is press-fitted into a connection hole 48 of a complementary shape formed in the valve element 24a to connect the valve element 24a to the tip end of the stem 38. In this case, the retainer 47 may have a cutout for easy contraction deformation of the connecting end of the stem 38. In the case where the connecting end of the stem 38 is formed with external threads and the connection hole 48 of the valve element 24a is formed with corresponding internal threads, so that the external threads and the internal threads are screwed to each other, the friction due to rotation for screwing generates particles of the materials of the stem 38 and the valve element 24a, so that the generated particles may adhere to the operator's hands to cause the contamination in the fluid-contact areas. However, a configuration where the valve element 24a is connected with the retainer 47 formed at the connecting end of the stem 38 by press-fitting as in the diaphragm valve 10 according to the first embodiment can suppress the contamination of the fluid-contact areas with the particles generated. In the above configuration, the stem 38 is connected with the valve element 24a simply by pushing. This facilitates the assembly work, and thus shortens the assembly work time.

Next, the assembly procedure of the diaphragm valve 10 according to the first embodiment will be described.

The pressurizing unit 14 is pre-assembled in a separate step. To assemble the pressurizing unit 14, in the state where the reduced portion 37a of the movable body 37 is inserted into the small-diameter portion 39a of the through hole 39 in the tubular body 35a of the first unit housing 35 and the enlarged portion 37b of the movable body 37 is inserted into the large-diameter portion 39b of the through hole 39 while the end of the biasing spring 41 is inserted into the annular spring groove 42 in the enlarged portion 37b of the movable body 37, the part of the first unit housing 35 formed below the flange 35b is inserted into the receiving hole 36a of the second unit housing 36. At this time, the plurality of bayonet claws 45 of the tubular body 35a is placed at the space between the plurality of bayonet claws 46 of the receiving hole 36a and is allowed to pass through the space to insert the part of the tubular body 35a formed below the flange 35b into the receiving hole 36a. After that, the first unit housing 35 and the second unit housing 36 are rotated relative to each other, thereby engaging the bayonet claws 45 of the tubular body 35a with the bayonet claws 46 of the receiving hole 36a to connect the first unit housing 35 and the second unit housing 36. As a result, as shown in FIG. 3, the pressurizing unit 14 can be handled as a single integrated unit. The enlarged portion 37b of the movable body 37 placed in the first pressurizing chamber 34 is larger than the small-diameter portion 39a of the through hole 39 of the first unit housing 35, so that the movable body 37 is held in the first pressurizing chamber 34. If necessary, the outside of the pressurizing unit 14 may be washed to remove particles and the like.

The O-ring 29 is mounted in advance in the annular receiving groove 26a on the protrusion 26 of the bonnet 13.

Next, the first diaphragm 24, the second diaphragm 25, the bonnet 13 and the pressurizing unit 14 are attached to the valve body 11 to assemble the diaphragm valve 10 in a clean environment with little dust. Specifically, the first diaphragm 24 is placed so that the valve element 24a is positioned in the first valve chamber 16 and the first valve chamber is partitioned by the first diaphragm 24, and the first diaphragm 24 is attached to the lower part of the valve body 11 by inserting the vertical support portion 24c of the first diaphragm 24 into the lower recess 15 of the valve body 11 and allowing the annular step 18 of the valve body 11 to receive the horizontal support portion 24d. The second diaphragm 25 is placed so that the pressing portion 25a is positioned in the second valve chamber 20 and the second valve chamber 20 is partitioned by the second diaphragm 25, and the second diaphragm 25 is attached to the upper part of the valve body 11 by inserting the tubular support portion 25c of the second diaphragm 25 into the upper recess 19 of the valve body 11.

Next, after the retainer 47 of the stem 38 protruding from the pressurizing unit 14 is press-fitted into the connection hole 48 of the valve element 24a of the first diaphragm 24 attached to the lower part of the valve body 11 to connect the stem 38 to the valve element 24a, the pressurizing unit is fixed to the valve body 11 with fasteners 44 such as bolts passed through the attachment holes 43 that penetrate through the first unit housing 35 and the second unit housing 36. At this time, the protruding portion 35c, which is a portion of the first unit housing 35 above the flange 35b of the pressurizing unit 14, is inserted into the lower recess 15 of the valve body 11. Thus, the vertical support portion 24c of the first diaphragm 24 is held between the outer peripheral surface of the protrusion 35c and the inner peripheral surface of the lower recess 15, and the horizontal support portion 24d of the first diaphragm 24 is held between the flange 35b, which is held between the valve body 11 and the second unit housing 36 of the pressurizing unit 14, and the annular step 18 of the valve body 11. The bonnet 13 is fixed to the upper part of the valve body 11 with fasteners 30 such as bolts. At this time, the protrusion 26 of the bonnet 13 is inserted into the upper recess 19 of the valve body 11 to hold the tubular support 25c of the second diaphragm 25 between the inner peripheral surface of the upper recess 19 of the valve body 11 and the outer peripheral surface of the protrusion 26 of the bonnet 13. The diaphragm valve 10 is assembled in this way.

As described above, the diaphragm valve 10 is configured so that the components such as the movable body 37 applied with lubricant and the biasing spring 41, which may cause contamination, are housed in the pressurizing unit 14 that can be handled as a single unit and the O-ring is pre-mounted in the annular receiving groove 26a of the protrusion 26 of the bonnet 13. The bonnet 13 and the pressurizing unit 14 can be attached to the valve body 11 only by pushing. The assembly therefore can be performed without touching the components applied with lubricant which often causes contamination. As a result, contamination of the fluid-contact areas can be suppressed.

Unlike the prior art, the valve element 24a of the first diaphragm 24 and the second diaphragm 25 are not connected with each other. This eliminates the screwing portion, etc., for connecting the valve element 24a of the first diaphragm 24 and the second diaphragm 25 with each other, and thus no screwing portions, which can be a source of particles, are placed in the fluid-contact areas. This therefore makes it possible to suppress contamination of the fluid due to generated particles.

Next, the operation of the diaphragm valve 10 according to the first embodiment used as a constant-pressure valve will be described. In the diaphragm valve 10, the valve element 24a is pushed upward via the stem 38 by the biasing force applied to the movable body 37 from the biasing spring 41 placed in the first pressurizing chamber 34 to be pressed against the valve seat 23. From this state, in response to the supply of working fluid into the second pressurizing chamber 31 through the working-fluid feeding port 28, the pressure in the second pressurizing chamber 31 rises to press the pressing portion 25a of the second diaphragm 25 downward, so that the pressing portion 25a moves through the communication passage 22 to come in contact with the valve element 24a. The pressing portion 25a further presses the valve element 24a downward against the biasing force applied from the biasing spring 41, so that the valve element 24a separates from the valve seat 23 to allow the fluid to flow from the first valve chamber 16 to the second valve chamber 20 through the gap between the valve element 24a and the valve seat 23 and the communication passage 22. The flow rate of fluid can be set to any value by regulating the working fluid fed to the second pressurizing chamber 31 to change the gap between the valve seat 23 and the valve element 24a. The valve element 24a will be stationary at a balancing position between the force applied to the valve element 24a from the biasing spring 41 via the movable body 37 and the stem 38 and the force applied from the pressing portion 25a to the valve element 24a, which is the resultant force of the push-up force with which the fluid pressure presses the lower surface of the second diaphragm 25 upward and the push-down force with which the working fluid in the second pressurizing chamber 31 presses the upper surface of the second diaphragm 25 downward. To be precise, both the lower surface of the valve element 24a and the diaphragm portion 24b of the first diaphragm 24 receive the pressure from the fluid in the first valve chamber 16, and the forces are substantially canceled out because the pressure-receiving areas of the lower surface of the valve element 24a and the diaphragm portion 24b are almost equal.

In this state, in response to an increase in the fluid pressure on the upstream, the pressure in the second valve chamber 20 also increases instantaneously. Then, the force that the lower surface of the second diaphragm 25 receives from the fluid becomes larger than the force that the upper surface of the second diaphragm 25 receives from the working fluid in the second pressurizing chamber 31, so that the second diaphragm 25 moves upward. The pressing portion 25a also accordingly moves upward, and the valve element 24a supported by the first diaphragm 24 and pressed toward the valve seat 23 by the biasing spring 41 also moves upward. Therefore, the opening area between the valve seat 23 and the valve element 24a is reduced, thus reducing the pressure in the second valve chamber 20. Finally, the valve element 24a becomes stationary at a balancing position between the force applied to the valve element 24a from the biasing spring 41 via the movable body 37 and the stem 38, and the force applied from the pressing portion 25a to the valve element 24a, which is the resultant force of the push-up force with which the fluid pressure presses the lower surface of the second diaphragm 25 upward and the push-down force with which the working fluid in the second pressurizing chamber 31 presses the upper surface of the second diaphragm 25 downward. At this time, if the pressure from the working fluid in the second pressurizing chamber 31 does not change significantly, the force that the upper surface of the second diaphragm 25 receives is substantially unchanged, so that the force that the lower surface of the second diaphragm 25 receives becomes substantially unchanged. Thus, the fluid pressure on the lower face of the second diaphragm 25, that is, the fluid pressure in the second valve chamber 20, is kept substantially the same as that before the pressure on the upstream increases.

On the other hand, in the state of the set flow rate, in response to a decrease in the pressure on the upstream, the pressure in the second valve chamber 20 also decreases instantaneously. Then, the force that the lower surface of the second diaphragm 25 receives from the fluid becomes smaller than the force that the upper surface of the second diaphragm 25 receives from the working fluid in the second pressurizing chamber 31, so that the second diaphragm 25 moves downward. The pressing portion 25a also accordingly moves downward, and the valve element 24a supported by the first diaphragm 24 and being in contact with the pressing portion 25a also moves downward. The opening area between the valve seat 23 and the valve element 24a therefore increases, thus increasing the pressure in the second valve chamber 20. Finally, the valve element 24a becomes stationary at a balancing position between the force applied to the valve element 24a from the biasing spring 41 via the movable body 37 and the stem 38, and the force applied from the pressing portion 25a to the valve element 24a, which is the resultant force of the push-up force with which the fluid pressure presses the lower surface of the second diaphragm 25 upward and the push-down force with which the working fluid in the second pressurizing chamber 31 presses the upper surface of the second diaphragm 25 downward. Similarly to the case of an increase in the upstream pressure, the fluid pressure in the second valve chamber 20 is kept substantially the same as that before the pressure on the upstream increases.

The above operation substantially keeps the fluid pressure in the second valve chamber 20, even if the upstream fluid pressure fluctuates in the diaphragm valve 10. Therefore, the diaphragm valve 10 can keep a substantially constant flow rate, as long as the pressure loss in the downstream piping does not change. The fluid pressure in the second valve chamber 20 can be adjusted by the pressure of the working fluid in the second pressurizing chamber 31. The flow rate therefore also can be adjusted by the working fluid. When no working fluid is fed to the second pressurizing chamber 31, the movable body 37 will be pushed up by the biasing force from the biasing spring 41, and the valve element 24a, which moves in conjunction with the movable body 37 via the stem 38, also will be pushed up. Therefore, the valve element 24a comes in contact with the valve seat 23 so that the valve element 24a can block the flow of the fluid.

Next, several modified embodiments of the diaphragm valve according to the present invention will be described.

Figure 7:
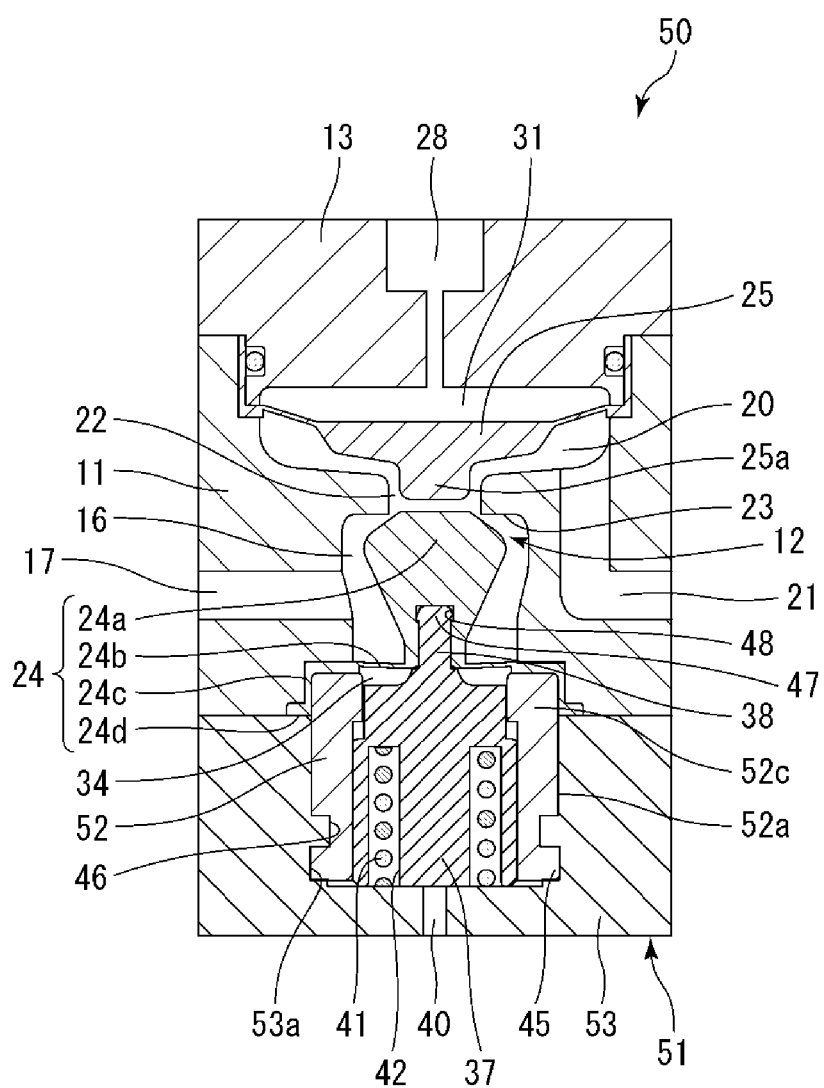
FIG. 7 is a vertical cross-sectional view showing a second embodiment of a diaphragm valve according to the present invention.

FIG. 7 shows a diaphragm valve 50 according to a second embodiment of the present invention. In FIG. 7, the same reference numerals denote components similar to those of the diaphragm valve 10 of the first embodiment shown in FIG. 1.

Similarly to the diaphragm valve 10 according to the first embodiment, the diaphragm valve 50 according to the second embodiment includes a valve body 11, a valve mechanism 12 disposed in the valve body 11, a bonnet 13 attached to the upper part of the valve body 11, and a pressurizing unit 51 attached to the lower part of the valve body 11, and the valve mechanism 12 is configured to open and close the diaphragm valve 50. The structures of the valve body 11, the valve mechanism 12, and the bonnet 13 of the diaphragm valve according to the second embodiment are the same as those of the diaphragm valve 10 according to the first embodiment, and the description thereof will be omitted. The pressurizing unit 51 in the diaphragm valve 50 according to the second embodiment is different from the pressurizing unit 14 in the diaphragm valve 10 according to the first embodiment in that the first unit housing 52 do not have a flange and the portion of the tubular body 52a excluding a protrusion 52c is housed in a receiving hole 53a of the second unit housing 53, so that the annular horizontal support portion 24d of the first diaphragm 24 is not held between the valve body 11 and the first unit housing 35 (specifically, a flange 35b thereof) as in the diaphragm valve 10 according to the first embodiment but is held between the valve body 11 and the second unit housing 53. Other structures of the second diaphragm valve 50, including the bayonet structure for connecting the first unit housing 52 and the second unit housing 53 with each other, and the method of assembling and operating the diaphragm valve 50, etc., are substantially the same as those of the diaphragm valve 10 according to the first embodiment, and therefore, the descriptions thereof are omitted.

Figure 8:
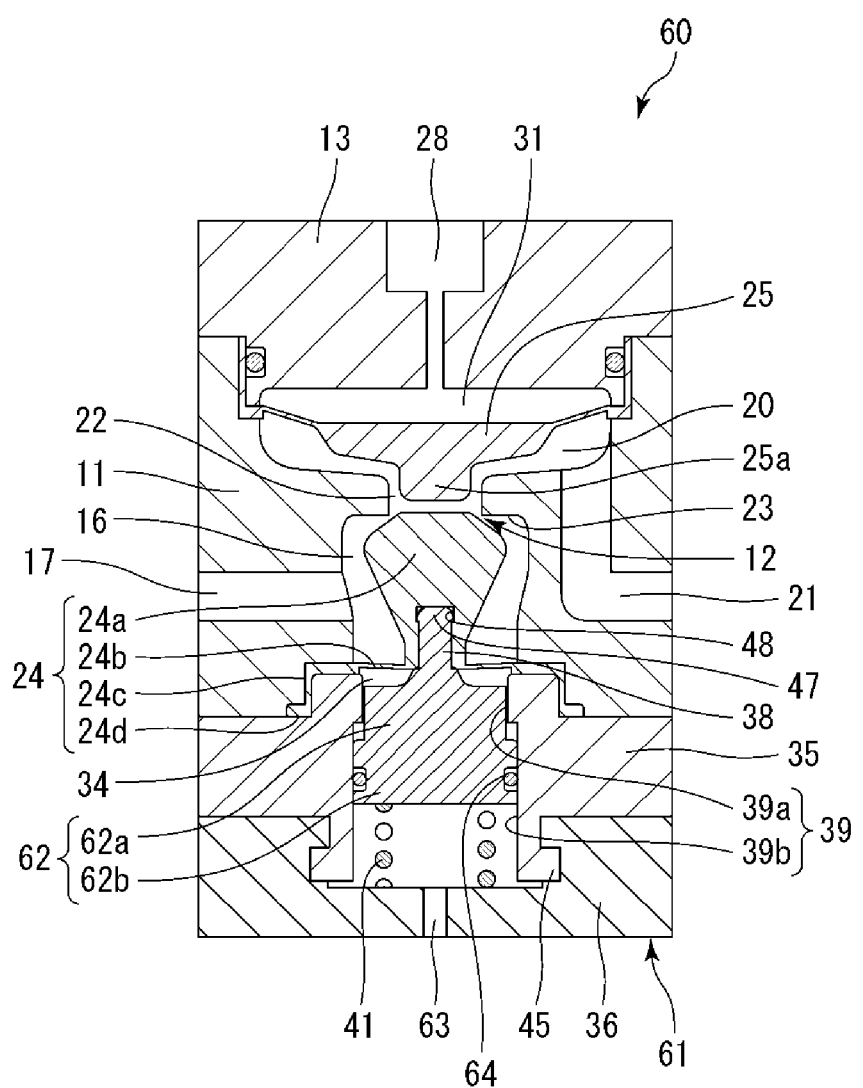
FIG. 8 is a vertical cross-sectional view showing a third embodiment of a diaphragm valve according to the present invention.

FIG. 8 shows a diaphragm valve 60 according to a third embodiment of the present invention. In FIG. 8, the same reference numerals denote components similar to those of the diaphragm valve 10 of the first embodiment shown in FIG. 1.

Similarly to the diaphragm valve 10 according to the first embodiment, the diaphragm valve 60 according to the third embodiment includes a valve body 11, a valve mechanism 12 disposed in the valve body 11, a bonnet 13 attached to the upper part of the valve body 11, and a pressurizing unit 61 attached to the lower part of the valve body 11, and the valve mechanism 12 is configured to open and close the diaphragm valve 60. The structures of the valve body 11, the valve mechanism 12, and the bonnet 13 of the diaphragm valve 60 according to the third embodiment are the same as those of the diaphragm valve 10 of the first embodiment, and the description thereof will be omitted. The pressurizing unit 61 in the diaphragm 60 according to the third embodiment is different from the pressurizing unit 14 in the diaphragm valve 10 according to the first embodiment in that the first pressurizing chamber 34 is a cylinder chamber and a piston 62, instead of the movable body 37 of the pressurizing unit 14 in the diaphragm valve 10 according to the first embodiment, is placed in the first pressurizing chamber 34 so that the piston 62 is always biased in the direction of pressing the valve element 24a against the valve seat 23 by working fluid serving as a first pressurizing means fed into the first pressurizing chamber 34 through a working-fluid feeding port 63 formed in the second unit housing 36. Like the movable body 37, the piston 62 includes a reduced portion 62a and an enlarged portion 62b. However, the piston 62 is different from the movable body 37 in that the outer peripheral surface of the enlarged portion 62b slides relative to the inner peripheral surface of the large-diameter portion 39b of the through hole 39 in the first unit housing 35 and there is provided a seal 64 for sealing between the outer peripheral surface of the piston 62 and the inner peripheral surface of the large-diameter portion 39b of the through hole 39. The first unit housing 35 has a breathing port (not shown) that is open to a space in the first pressurizing chamber 34 on the opposite side of the space where the working-fluid feeding port 63 opens, having the piston 62 between the spaces. In the embodiment shown in FIG. 8, a biasing spring 41 is disposed in the first pressurizing chamber 34 for biasing the piston 62 in the direction of pressing the valve element 24a against the valve seat 23. However, the biasing spring 41 may be omitted. Other structures of the diaphragm valve 60, including the bayonet structure for connecting the first unit housing 35 and the second unit housing 36 with each other, and the method of assembling and operating the diaphragm valve 60, etc., are substantially the same as those of the diaphragm valve according to the first embodiment, and therefore, the descriptions thereof are omitted.

Figure 9:
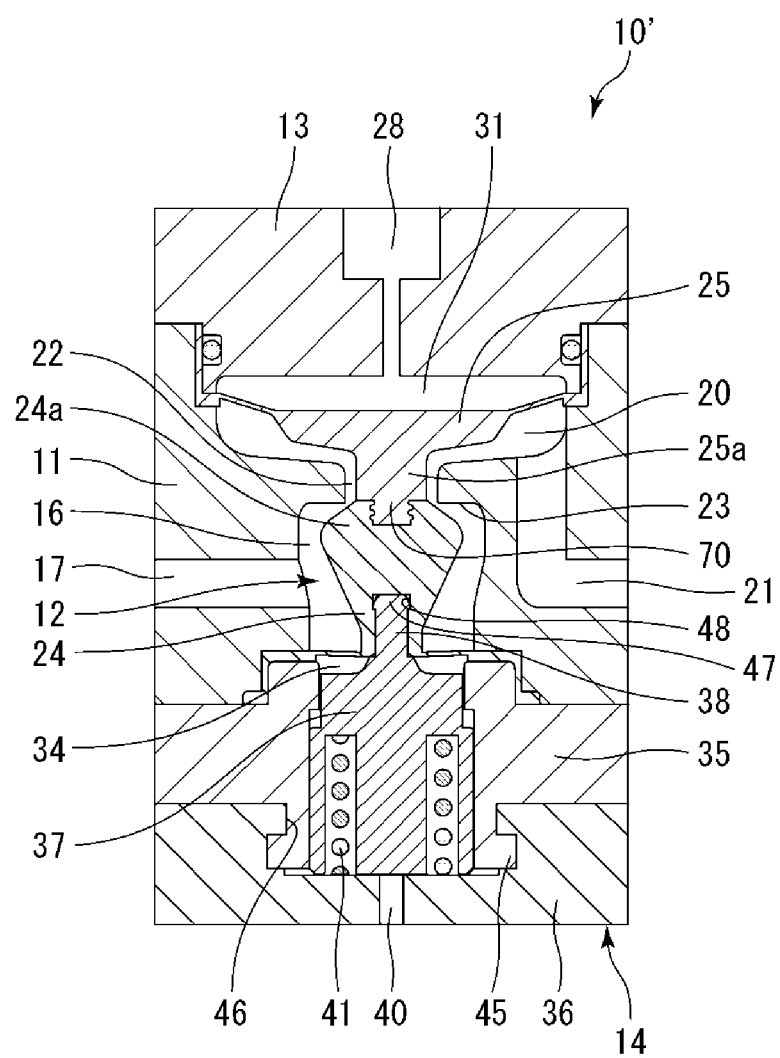
FIG. 9 is a vertical cross-sectional view showing a fourth embodiment of a diaphragm valve according to the present invention.
Figure 10:
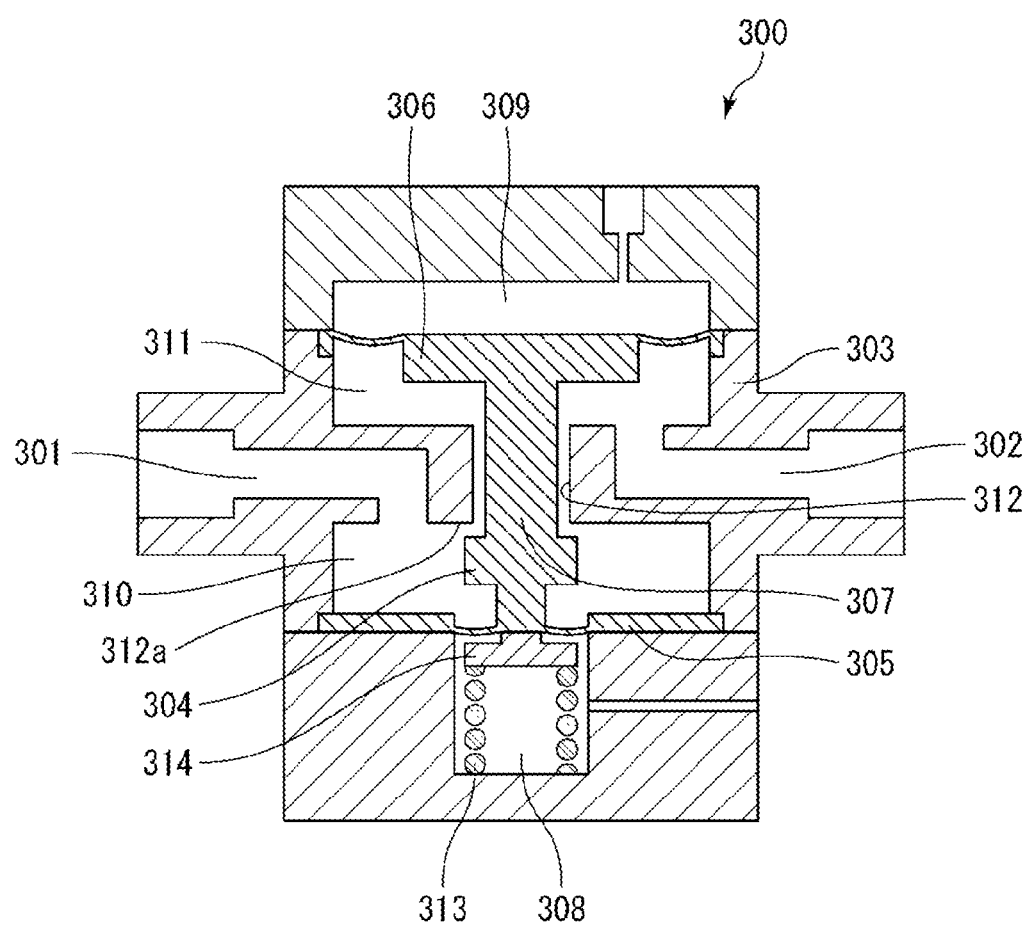
FIG. 10 is a vertical cross-sectional view showing a structure of a conventional diaphragm valve used as a flow control valve.

The diaphragm valves according to the present invention have been described above with reference to the embodiments shown in the figures. However, the present invention is not limited to the shown embodiments, as long as the pressurizing unit can be handled as a single unit during assembly. For example, in the shown embodiments, working fluid, a biasing spring, or a combination thereof is used as the first pressurizing means. However, it is possible to use a solenoid (electromagnet) as the first pressurizing means. Similarly, although the working fluid is used as the second pressurizing means, a biasing spring may be used as the second pressurizing means instead of or in addition to the working fluid. Further, in the shown embodiments, the valve element 24a of the first diaphragm 24 and the pressing portion 25a of the second diaphragm 25 come in contact with or are separated from each other. However, as in a diaphragm valve 10' of to a fourth embodiment shown in FIG. 9, a screwing portion 70 may be provided on the valve element 24a and the pressing portion 25a to connect the valve element 24a and the pressing portion 25a with each other. In addition, a constant-pressure valve has been described above as an application of the diaphragm valve according to the present invention. However, the application of the diaphragm valve according to the present invention is not limited to a constant-pressure valve, and the present invention is applicable to other valves including a suck back valve and an on/off valve as long as it has the configuration defined in the claims.

DESCRIPTION OF REFERENCE NUMERALS 10, 10' diaphragm valve
11 valve body
12 valve mechanism
13 bonnet
14 pressurizing unit
16 first valve chamber
17 inlet flow passage
20 second valve chamber
21 outlet flow passage
22 communication passage
23 valve seat
24 first diaphragm
25 second diaphragm
28 working-fluid feeding port
31 second pressurizing chamber
34 first pressurizing chamber
35 first unit housing
35a tubular body
35b flange
36 second unit housing
36a receiving hole
37 movable body
37a reduced portion
37b enlarged portion
38 stem
39 through hole
39a small-diameter portion
39b large-diameter portion
41 biasing spring
45 bayonet claw
46 bayonet claw
47 retainer
48 connection hole
50 diaphragm valve
51 pressurizing unit
52 first unit housing
52a tubular body
53 second unit housing
60 diaphragm valve
61 pressurizing unit
62 piston
63 working-fluid feeding port

The invention claimed is:

1. A diaphragm valve comprising:
a valve body having formed therein a first valve chamber being in communication with an inlet flow passage, a second valve chamber being in communication with an outlet flow passage, and a communication passage providing communication between the first valve chamber and the second valve chamber;
a valve seat formed in the communication passage;
a valve mechanism including a valve element that comes in contact with and separates from the valve seat, a first diaphragm attached to the valve body so as to face the first valve chamber and supporting the valve element, and a second diaphragm attached to the valve body so as to face the second valve chamber;
a pressurizing unit attached to the valve body so as to hold an outer peripheral part of the first diaphragm between the pressurizing unit and the valve body, said pressurizing unit pressurizing the first diaphragm so as to press the valve element against the valve seat; and
a bonnet attached to the valve body so as to hold an outer peripheral part of the second diaphragm between the bonnet and the valve body,
said pressurizing unit including: a first unit housing having a first engaging portion and a second unit housing having a second engaging portion, that are assembled to define therein a first pressurizing chamber; a movable body, which is a spring retainer, movable toward and away from the first valve chamber in the first pressurizing chamber; and a stem extending from the movable body to project outside of the pressurizing unit, said pressurizing unit being configured as a single integrated unit by engaging the first engaging portion with the second engaging portion to connect the first unit housing and the second unit housing with the movable body being held in the first pressurizing chamber, said valve element being connected to a tip end of the stem, said valve mechanism controlling a flow of fluid by pressurizing the movable body with a first pressurizing means to constantly apply a force to the valve element via the stem in a direction of pressing the valve element against the valve seat and pressurizing the second diaphragm with a second pressurizing means to apply a force to the valve element from the second diaphragm in a direction of separating the valve element from the valve seat, and said first pressurizing means being a biasing spring which is disposed in the first pressurizing chamber and biases the spring retainer so as to press the valve element against the valve seat via the stem.

2. The diaphragm valve according to claim 1, wherein the second diaphragm has a pressing portion that can come in contact with and separate from the valve element of the first diaphragm, and the pressing portion is configured to be brought in contact with the valve element by the second pressurizing means applying the force to the second diaphragm in a direction of bringing the second diaphragm closer to the valve seat to separate the valve element from the valve seat against the force applied to the valve element by the first pressurizing means.

3. The diaphragm valve according to claim 2, wherein the first unit housing has a tubular body formed with a through hole, said through hole including a small-diameter portion facing the first diaphragm and a large-diameter portion being larger than the small-diameter portion and connecting to the small-diameter portion so as to form a shoulder therebetween, said first unit housing and said second unit housing being connected with each other so that the second unit housing closes an end of the through hole on the side of the large-diameter portion, thus defining therein the first pressurizing chamber, said small-diameter portion of the through hole being configured to have a size that allows passage of the stem and is smaller than at least a part of the movable body disposed in the first pressurizing chamber so that at least the part of the movable body interferes with the shoulder to hold the movable body in the first pressurizing chamber.

4. The diaphragm valve according to claim 3, wherein the first unit housing further includes a flange protruding outwardly from a peripheral wall of the tubular body and being held between the valve body and the second unit housing.

5. The diaphragm valve according to claim 1, wherein the first engaging portion of the first unit housing and the second engaging portion of the second unit housing have a bayonet structure.

6. The diaphragm valve according to claim 1, wherein the second pressurizing means is working fluid fed to a second pressurizing chamber formed in the bonnet to pressurize the second diaphragm, a biasing spring disposed in the second pressurizing chamber formed in the bonnet, or a combination thereof.

7. The diaphragm valve according to claim 1, wherein the valve element and the stem are connected with each other by press-fitting.

* * * * *